US007758819B2

(12) United States Patent
Nagelhout (10) Patent No.: US 7,758,819 B2
(45) Date of Patent: Jul. 20, 2010

(54) GAS FLOW NEUTRALIZING DEVICE AND METHOD

(75) Inventor: Gerrit Johannes Nagelhout, Edam (NL)

(73) Assignee: Stichting Rechtenbeheer Knauf, DE Heerhugowaard (NL)

( * ) Notice: Subject to any disclaimer, the term of this patent is extended or adjusted under 35 U.S.C. 154(b) by 1464 days.

(21) Appl. No.: 10/257,669

(22) PCT Filed: Apr. 17, 2001

(86) PCT No.: PCT/NL01/00305

§ 371 (c)(1),
(2), (4) Date: Jan. 27, 2003

(87) PCT Pub. No.: WO01/78867

PCT Pub. Date: Oct. 25, 2001

(65) Prior Publication Data

US 2003/0152496 A1     Aug. 14, 2003

(30) Foreign Application Priority Data

Apr. 13, 2000   (NL) ................................. 1014938

(51) Int. Cl.
*B01D 50/00* (2006.01)
*F02M 29/04* (2006.01)
(52) U.S. Cl. .................... 422/170; 261/98; 261/108; 261/125
(58) Field of Classification Search ............. 422/168, 422/169; 55/228
See application file for complete search history.

(56) References Cited

U.S. PATENT DOCUMENTS

| 2,997,131 | A | * | 8/1961 | Fisher ................... 55/466 |
| 4,039,307 | A | * | 8/1977 | Bondor ................. 96/235 |
| 4,865,817 | A | * | 9/1989 | Burgess et al. ....... 422/168 |
| 5,676,913 | A | | 10/1997 | Cirillo et al. |
| 5,879,434 | A | | 3/1999 | Kiss |

FOREIGN PATENT DOCUMENTS

| DE | 4404 284 A1 | 8/1995 |
| EP | 0 742 039 A1 | 11/1996 |
| EP | 0 745 421 A1 | 12/1996 |
| WO | WO 99/28017 | 6/1999 |

* cited by examiner

*Primary Examiner*—Tom Duong
(74) *Attorney, Agent, or Firm*—Young & Thompson (57) ABSTRACT

A waste gases-neutralizing device comprises a filter installation with at least one filter unit with an inlet and an outlet between which a filter is received to remove undesired components from the waste gases. The installation has a modular construction and comprises a number of filter units which are placed in series in a flow path of the waste gases and/or a reactor vessel provided with a nozzle with mixing chamber in which waste gases are at least partially removed with a mixture of at least one neutralizing compound and oxygen under pressure. The filter units each comprise a filter adapted to a specific component or group of components to be removed from the waste gases. The waste gases-neutralizing device preferably also comprises, in addition to the filter installation, a neutralizing unit 21 comprising a neutralizing liquid bath or a fixed connection impregnated with a neutralizing liquid.

10 Claims, 13 Drawing Sheets

GAS FLOW NEUTRALIZING DEVICE AND METHOD

This is a 371 National Stage application of International application no. PCT/NL01/00305, filed Apr. 17, 2001, which claims priority to Netherlands application no. 1014938, filed Apr. 13, 2000. The entire contents of the above-referenced applications are hereby incorporated by reference in their entirety.

The present invention relates to a waste gases-neutralizing device comprising a filter installation with at least one filter unit with an inlet and an outlet between which a filter is received and/or a reactor vessel to remove undesired components to at least a significant extent from the waste gases.

BACKGROUND OF THE INVENTION

Such an installation with at least one filter unit is generally known and normally comprises a set of carbon filters with active carbon which is able to remove from the waste gases possible contaminants therein. National and international environmental standards increasingly require the use of such filters to ensure that possible harmful waste gas components do not enter the environment. Active carbon filters provide only a partial solution herefor. The operation thereof is based on adsorption of harmful components to the carbon surface. This must therefore preferably be as large as possible, which means in practice that the waste gases are carried through a porous bed of active carbon. Although a large part of the harmful constituents can thus be removed per se from the waste gases, this produces a significant resistance in the outflow of the waste gases. The carbon bed therefore has to be relatively voluminous so that this resistance does not rise to unacceptable levels, which is expensive. The filter moreover becomes saturated relatively quickly, whereby the effectiveness of the filter will eventually decrease significantly. In order to avoid the filtering action finally becoming inadequate, the filter has to be changed before this occurs, for which purpose the installation usually has to be taken out of operation.

The above stated drawbacks do not affect a filter installation of the type stated in the preamble as known from the Netherlands patent application no. 1000918. The filter installation described therein is based on a filter unit having therein a liquid bath of an active filtering liquid. The period of operation of such a liquid bath can be considerably longer than that of a carbon filter, while after a period of time the quantity of liquid can be replenished in simple manner from outside or otherwise without the installation having to be taken out of operation. The operation of this installation is based on a chemical interaction between the waste gases and the odour-neutralizing liquid, whereby harmful components in the waste gases are intercepted and converted in the airflow. A superficial contact between the waste gases and the liquid is already found to be sufficient for this purpose, so that the resistance of such an installation in the flow path of the waste gases can remain limited. A significant part of the undesired components in the waste gases can thus be removed therefrom. A drawback of such a liquid filter is however that the operation thereof is to a greater or lesser degree specific to determined components or groups of components in the waste gases, depending on the specific choice of the filtering liquid, whereby sometimes in practice not all undesired components can be removed effectively from the waste gases.

SUMMARY OF THE INVENTION

The present invention has for its object to provide a filter installation of the type stated in the preamble which has these drawbacks at least to a lesser degree or not at all.

In order to achieve the stated objective, a waste gases-neutralizing device comprising a filter installation of the type stated in the preamble has the feature according to the invention that the installation has a modular construction and comprises a number of filter units which are placed in series in a flow path of the waste gases, and that the filter units each comprise a filter adapted to a specific component or group of components to be removed from the waste gases. In the installation according to the invention a modular construction is thus utilized, whereby the installation can be adapted per module to the specific conditions of a situation. A preferred embodiment of the filter installation according to the invention herein has the feature that the filter comprises a bath with a waste gas-neutralizing liquid which is capable of interaction with the waste gases so as to remove an undesired component or group of components therefrom to at least a significant extent, and more particularly that the installation comprises a number of filter units, each with a different waste gas-neutralizing liquid. In this manner different active waste gas-neutralizing liquids can be applied simultaneously in the installation, wherein the second or further liquid is adapted to the components or groups of components which are intercepted to an insufficient extent by the other liquid(s). A virtually complete air purification can thus be effected for at least practically any situation while retaining the advantages of the filter system described in the above stated Netherlands patent application.

A particular embodiment of the waste gases-neutralizing device according to the invention has the feature that the flow path of the waste gases leads along a surface of the liquid bath. Just such a superficial contact between liquid and waste gases is found in practice to be sufficient to obtain an adequate interaction between the two. In addition, filtering liquid can if desired be actively atomized into the waste gases to obtain a pretreatment or after-treatment, although in many cases this is not necessary.

A further particular embodiment of the waste gases-neutralizing device comprising a filter installation according to the invention has the feature that the flow path of the waste gases is also guided along a filter impregnated with a waste gas-neutralizing compound. An impregnated filter is preferably produced in situ by placing a known filter, such as a filter of active carbon, lignite or granulate, into contact with a bath of such a waste gas-neutralizing liquid.

It has been found that the filtering action increases with an increasing contact time between liquid and waste gases. In order to enhance the efficiency of the filter unit without increasing the external dimensions thereof, a further particular embodiment of the waste gases-neutralizing device comprising a filter installation according to the invention has the feature that at the position of the liquid bath at least a first baffle is arranged which extends over a part of the distance between two mutually opposite walls of the filter unit. A (small) resistance is thus incorporated into the flow path of the waste gases at the position of the liquid bath, whereby the residence time at that position increases, and thereby the effectiveness of the filter. Furthermore, the waste gases are herein urged by the baffle or the baffles along the liquid surface, whereby the contact between the two is also enhanced. In a particular embodiment in which this is optimized, the waste gases-neutralizing device comprising a filter installation according to the invention has the feature that at the position of the liquid bath the filter unit comprises a system of a number of mutually offset baffles. The baffles thus form as it were a labyrinth in which the waste gas flow meanders so that as it passes the liquid bath it has as much contact as possible therewith.

Surprisingly, it has been found that the effectiveness of the installation, in accordance with the specific composition of the waste gases in a particular situation, depends on the position of the system of baffles relative to the inlet and outlet of the filter unit. With a view hereto, a further particular embodiment of the filter installation according to the invention has the feature that the system of baffles is mounted for manual, electrical, hydraulic or pneumatic axial displacement in the flow path of the waste gases. Because the baffles are thus displaceable, the device can be adapted and adjusted on-site to the most effective possible operation in a particular situation.

In order to further enhance the contact between liquid and waste gases, a particular preferred embodiment of the waste gases-neutralizing device comprising a filter installation according to the invention has the feature that at least at the position of the bath with the waste gases-neutralizing liquid at least one vertical inner wall of the filter unit is covered with a porous layer. Such a covering of the walls will result in a capillary action, wherein filtering liquid is absorbed into the covering material and rises above the level of the liquid. The total contact area in the installation can thus be increased to a significant extent without the dimensions or resistance of the device practically increasing. The material of the wall covering is of relatively minor importance here as long as it has sufficient porosity to ensure an adequate capillary action. Contaminants possibly present in the material are incidentally neutralized to a greater or lesser degree here by the filtering liquid absorbed therein, this in accordance with the nature of the contamination.

In a further particular embodiment the waste gases-neutralizing device comprising a filter installation according to the invention has the feature that the filter unit has an at least substantially rectangular cross-section, that the inlet and outlet are placed diametrically opposite each other and the outlet fits at least practically gas-tightly into the inlet. By thus placing the inlet and outlet diametrically opposite each other and adapting the dimensions thereof to each other, filter units can thus be connected together, without further intermediate conduits or couplings, by inserting the units directly into one another. An exceptionally compact whole is thus obtained which moreover can be further extended very quickly in the manner of building blocks.

The invention also relates to a filter unit for use in a filter installation in a waste gases-neutralizing device according to the invention as specified above.

In a further embodiment the waste gases-neutralizing device comprising a filter installation according to the invention has the feature that after a final filter unit there is placed a neutralizing unit comprising a fixed connection on which a waste gases-neutralizing liquid is impregnated which is able to make contact with the waste gases in order to remove to at least a significant extent from the waste gases reaction products of a filter unit possibly present therein. Finally, a unit is herein incorporated in the installation which can remove from the waste gases, or at least neutralize, possible reaction products of the preceding filter units, so that these products cannot enter the environment instead of the original contaminant.

According to another aspect of the invention a waste gases-neutralizing device according to the invention comprises a reactor vessel wherein oxygen, for instance in the form of air, is caused to react with a waste gases-neutralizing compound. This reaction preferably takes place at a temperature between 17° C.-28° C., preferably at a temperature of 20° C.-23° C., more preferably at a temperature of 21.7° C. This reaction preferably further takes place under a pressure of 1 to 200 bar, more preferably under a pressure of 5 to 25 bar. Once the reaction between the waste gases-neutralizing compound and the oxygen has taken place, another temperature or pressure at the location of the waste gases, for instance in an outlet channel, then no longer has any influence.

The waste gases such as for instance hydrocyanic acid and isocyanate, but also viruses and bacteria such as legionella bacteria, are preferably mixed in the vessel. The waste gases-neutralizing compound and the oxygen, preferably present in air, are mixed in the dish of the nozzle under pressure at 1 to 25 bar, and this mixture is then pressed into the vessel and with the formed compound brought into contact with the waste gases in the vessel, wherein the waste gases are at least partially removed. Such a nozzle for use on a reaction vessel in a waste gases-neutralizing device according to the invention also forms an aspect of the invention.

In addition to a modular filter installation as described above, a waste gases-neutralizing device preferably also comprises a reactor vessel as also described above. In further preference such a waste gases-neutralizing device also contains a UV generator. Any UV generator known to the skilled person, such as for instance UV strip lighting or UV lamps, can be applied. The sequence of the components of the waste gases-neutralizing device is not important here; the modular filter installation can also be placed at the end of the components, i.e. after the UV generator. Also falling within the invention is any combination of at least one of the elements filter installation, neutralizing unit, reactor vessel and UV generator, wherein the UV generator must be present together with a minimum of one of the other components.

As waste gases-neutralizing compounds, also referred to as active substances, can be applied one or more of the following compounds which are commercially available from Knauf of Edam or Aromatec of Oldenburg. All these waste gases-neutralizing compounds reduce the content of hydrocarbons, but usually also have other specific applications:

Spezialwirkstoff Poly, neutralizes or removes hydrocarbons,
EQ-CW and GN-ISO remove especially cellulose and other polysaccharide compounds,
Spezial Fettlöser Neutral, removes fats as well as germs and bacteria,
Hydro Stat, cleans bacteria such as *E. coli, Pseudomonas aeruginosa* and the like from sewage water,
Geruchsabsorber neutral, removes fungus cultures, such as for instance *Candida albicans,*
Anti-Urin, reduces penetrating odours, such as for instance urine, oils or rotting fruit,
Brandschadensanierung 1 and 2, intercepts sulphur,
Ammoniaklöser-Absorber, intercepts ammonia,
Airfresh Granulat and Airfresh Granulat neutral, with Spezialwirkstoff Poly absorbed on granulate.

Other applications of the active substances can be found by the skilled person if these active substances are applied in different proportions, if desired in known solvents. The waste gas-neutralizing compound Geruchsabsorber neutral can for instance be applied successfully in a ratio of 99:1 to 50:50 fungus suspension relative to the waste gas-neutralizing compound.

BRIEF DESCRIPTION OF THE DRAWINGS

The invention will now be further elucidated with reference to five embodiments and an associated drawing. In the drawing.

DETAILED DESCRIPTION OF THE INVENTION

The figures are otherwise purely schematic and not drawn to scale. Some dimensions in particular are exaggerated for the sake of clarity. Corresponding parts are designated in the figures with the same reference numeral.

Figure 1:
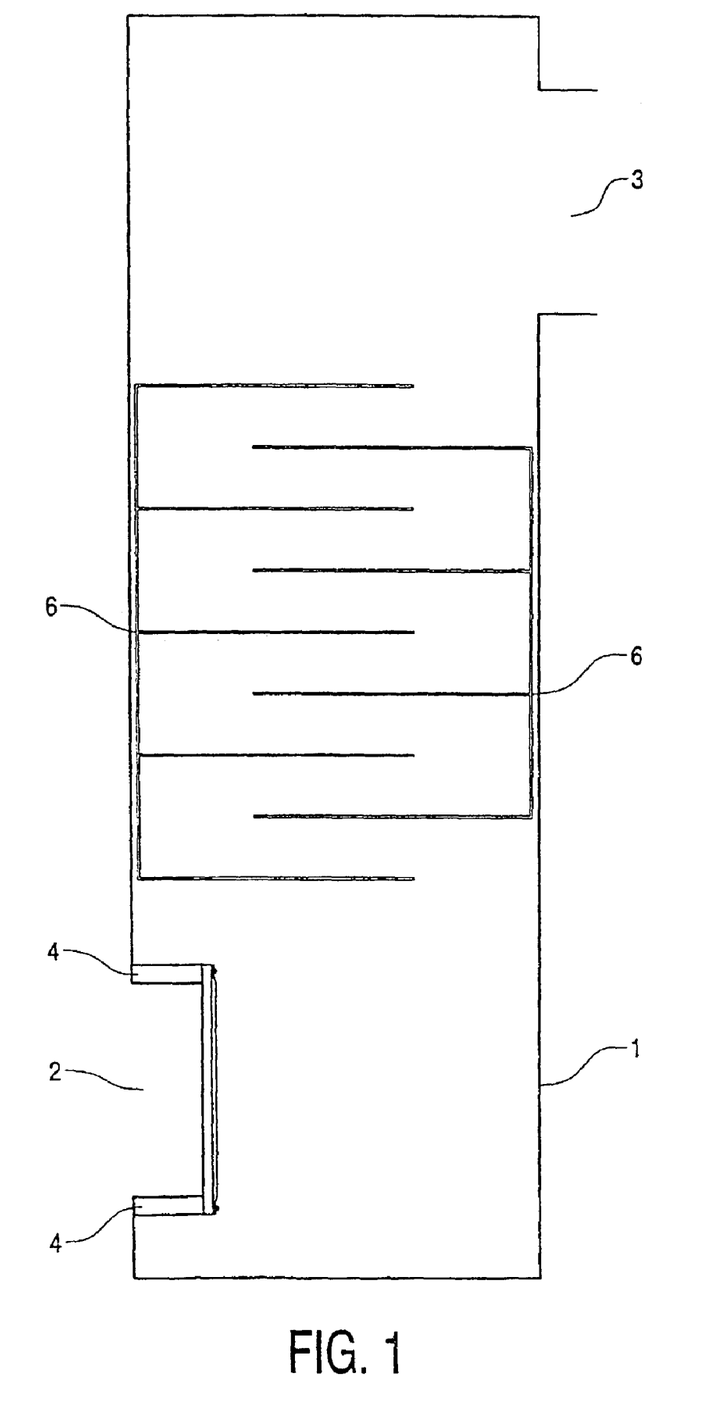
FIG. 1 shows a longitudinal section of a filter unit of an embodiment of a waste gases-neutralizing device according to the invention comprising a filter installation.
Figure 2:
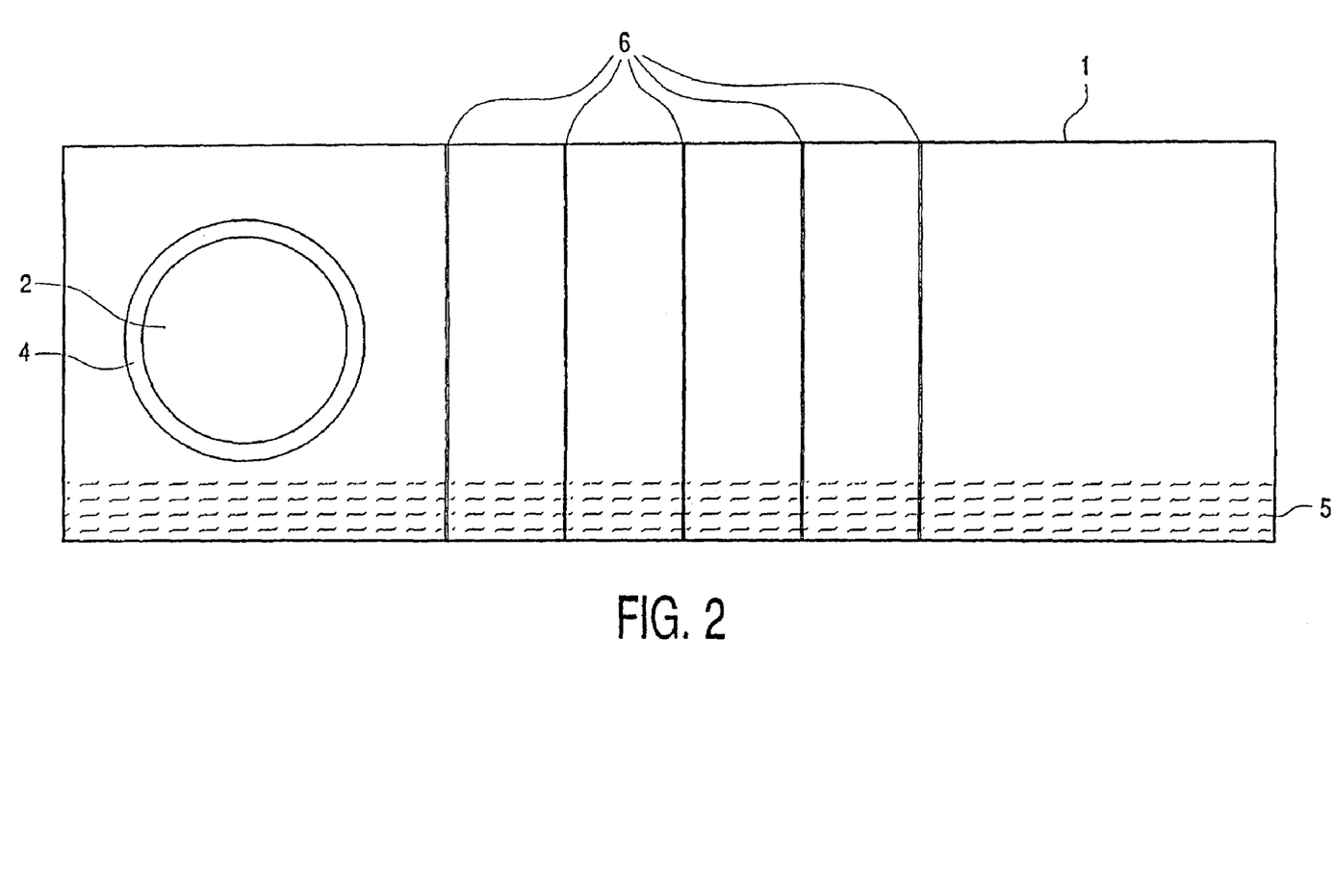
FIG. 2 shows a first side view of the filter unit of FIG. 1.
Figure 3:
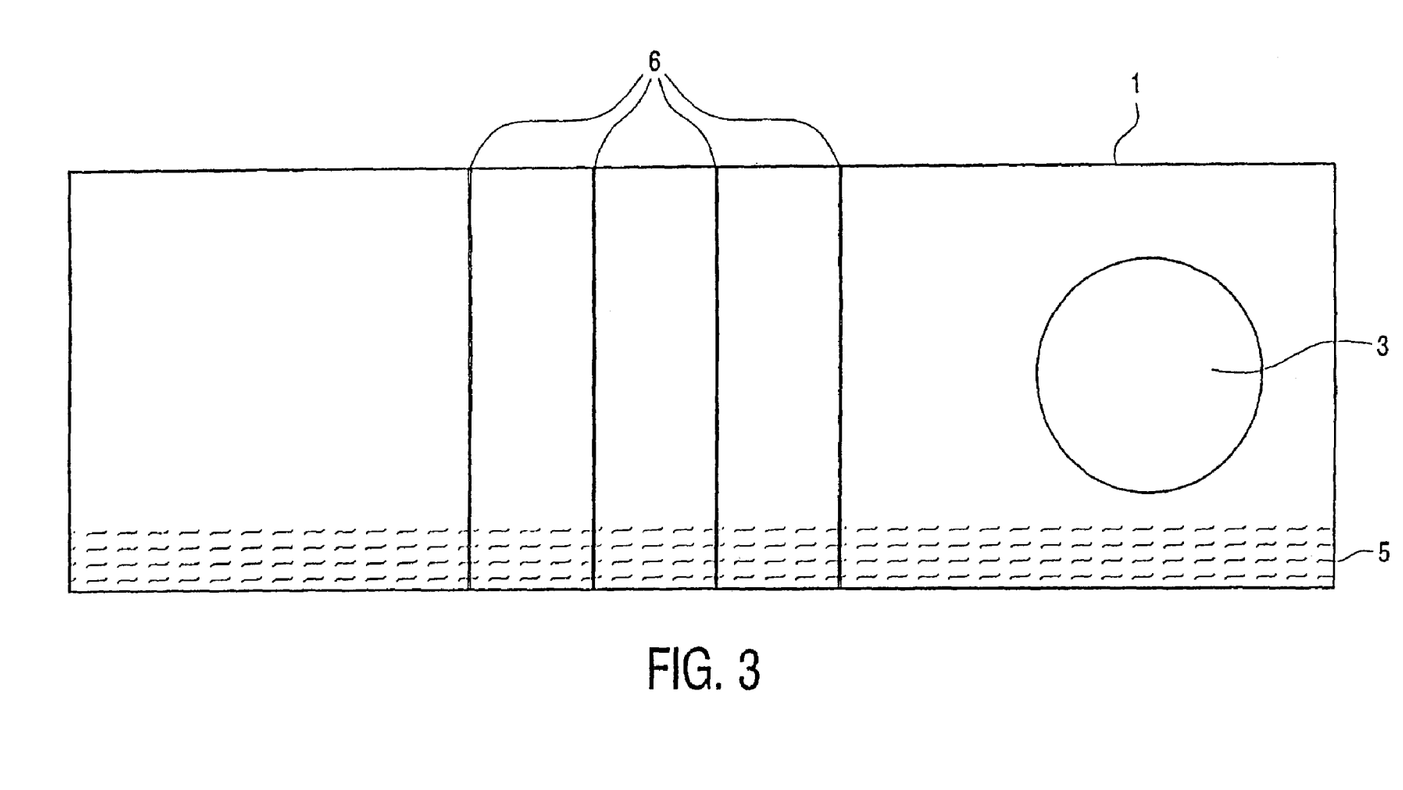
FIG. 3 shows a second side view of the filter unit of FIG. 1.

A practical embodiment of a filter installation according to the invention is constructed on the basis of a filter unit as shown in FIG. 1 in longitudinal section and in FIGS. 2 and 3 in different side views. The filter unit comprises a solid, low-maintenance housing 1 of high-grade stainless plate steel with an inlet 2 and an outlet 3. Inlet 2 is herein provided with a gasket 4 which is able to seal in airtight manner a pipe having at least practically the external dimensions of outlet 3. By thus placing inlet 2 and outlet 3 diametrically opposite each other and dimensioning them thus, individual filter units can readily be inserted into one another and thus coupled together in a serial arrangement.

Situated over the entire bottom of housing 1 is a liquid bath 5 with a filtering liquid which is able to remove from the waste gases at least a part of the undesired components therein. This filtering liquid is adapted to the specific composition of the waste gases in a practical situation. Situated at the position of the liquid bath between inlet 2 and outlet 3 is a system of baffles 6 which are disposed for manual displacement. The baffles 6 on both sides of the unit are mutually connected and can thus be placed integrally in the desired position. Situated for this purpose on the outside of the unit are two control members (not further shown) with which the unit can be adapted and adjusted so as to obtain the best possible operation. It has been determined experimentally that the position of the baffle system 6 relative to enlet 2 and outlet 3 does influence the effectiveness of the unit.

As shown in the side views of FIGS. 2 and 3, baffles 6 extend over the full height of the device, whereby the waste gases are urged into a meandering flow path between the baffles. This enhances the contact with liquid 5, and therewith the effectiveness and efficiency of the installation. Advantageously applied as liquid is the filtering liquid commercially obtainable under the name Spezialwirkstoff Poly, which has shown in practice that it effectively neutralizes the most usual contaminants in waste gases. Ammonia vapours, occurring hydrocarbons, particularly such as styrene, terpentine and ethyl acetate vapours, and unpleasant odours, such as for instance those from fried fish and slaughter and fish waste, can among others thus be effectively removed from waste gases. The said liquid is even found to be able to remove heavy metals from waste gases and to cause irreversible precipitation thereof into the liquid. On an outer side of the housing a feed to liquid bath 5 can if desired be arranged, whereby the liquid can be replenished without the unit having to be opened and taken out of operation for this purpose. This feed is not shown in the figure, but the practical embodiment thereof is assumed to be sufficiently known to a person with ordinary skill in the art.

Figure 4:
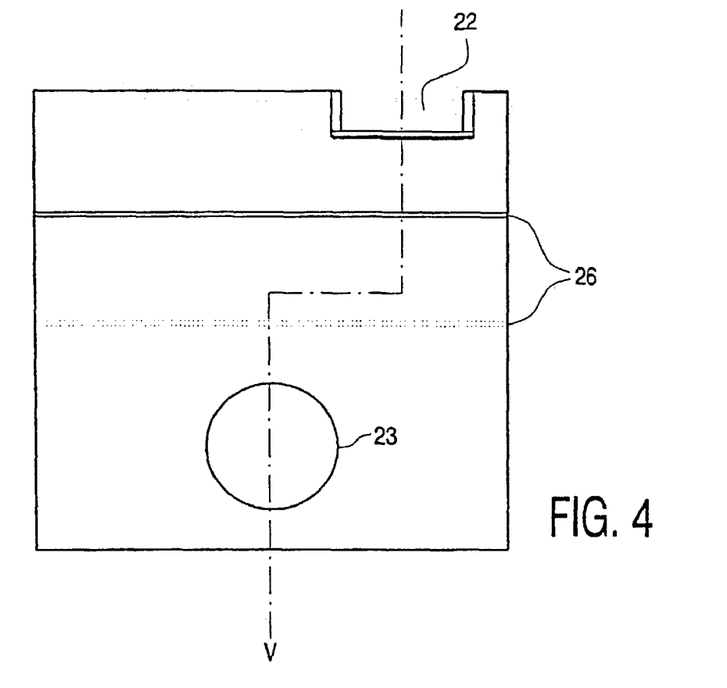
FIG. 4 shows a longitudinal section of a neutralizing unit of an embodiment of a waste gases-neutralizing device according to the invention comprising a filter installation.
Figure 5:
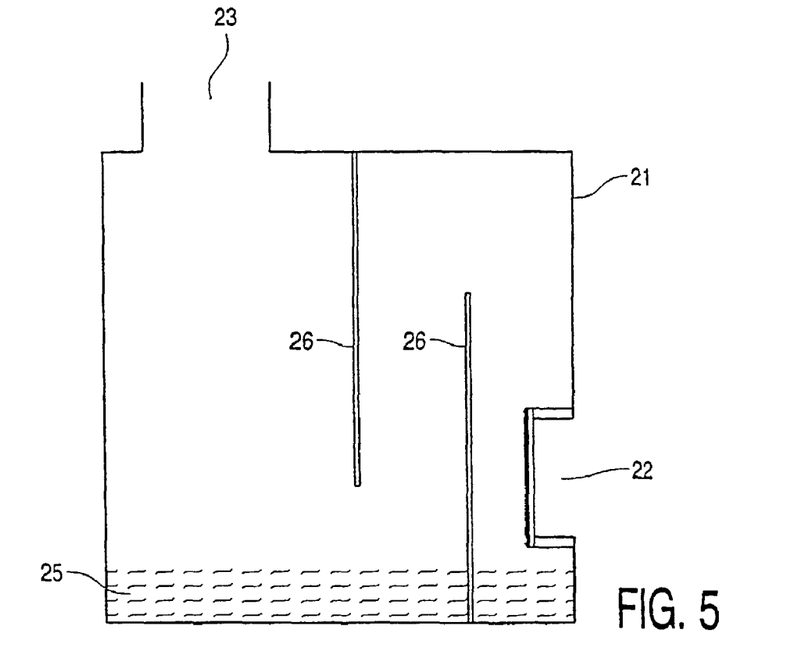
FIG. 5 is a cross-section of the neutralizing unit of FIG. 4 along the line V-V.

In order to ensure that possible reaction products of the filter unit cannot enter the environment instead of the original contaminant, the filter installation of this embodiment comprises as final stage a neutralizing unit 21 as shown schematically in longitudinal section in FIG. 4 and in cross-section in FIG. 5, in FIG. 4 along the line V-V. The neutralizing unit comprises an inlet 22 and an outlet 23 and, like the preceding filter unit 1, a liquid bath 25. This liquid bath 25 is optimally adapted to intercept and neutralize reaction products from filter unit 1 and components possibly not yet removed from the waste gases. A system of two baffles 26 in the neutralizing unit here also urges the waste gases over the neutralizing liquid. Also applied as neutralizing liquid in the neutralizing liquid bath is for instance the liquid commercially obtainable under the name Spezialwirkstoff Poly, although the other above-mentioned waste gases-neutralizing compounds can be applied for this purpose, depending on the compound for neutralizing.

Figure 6:
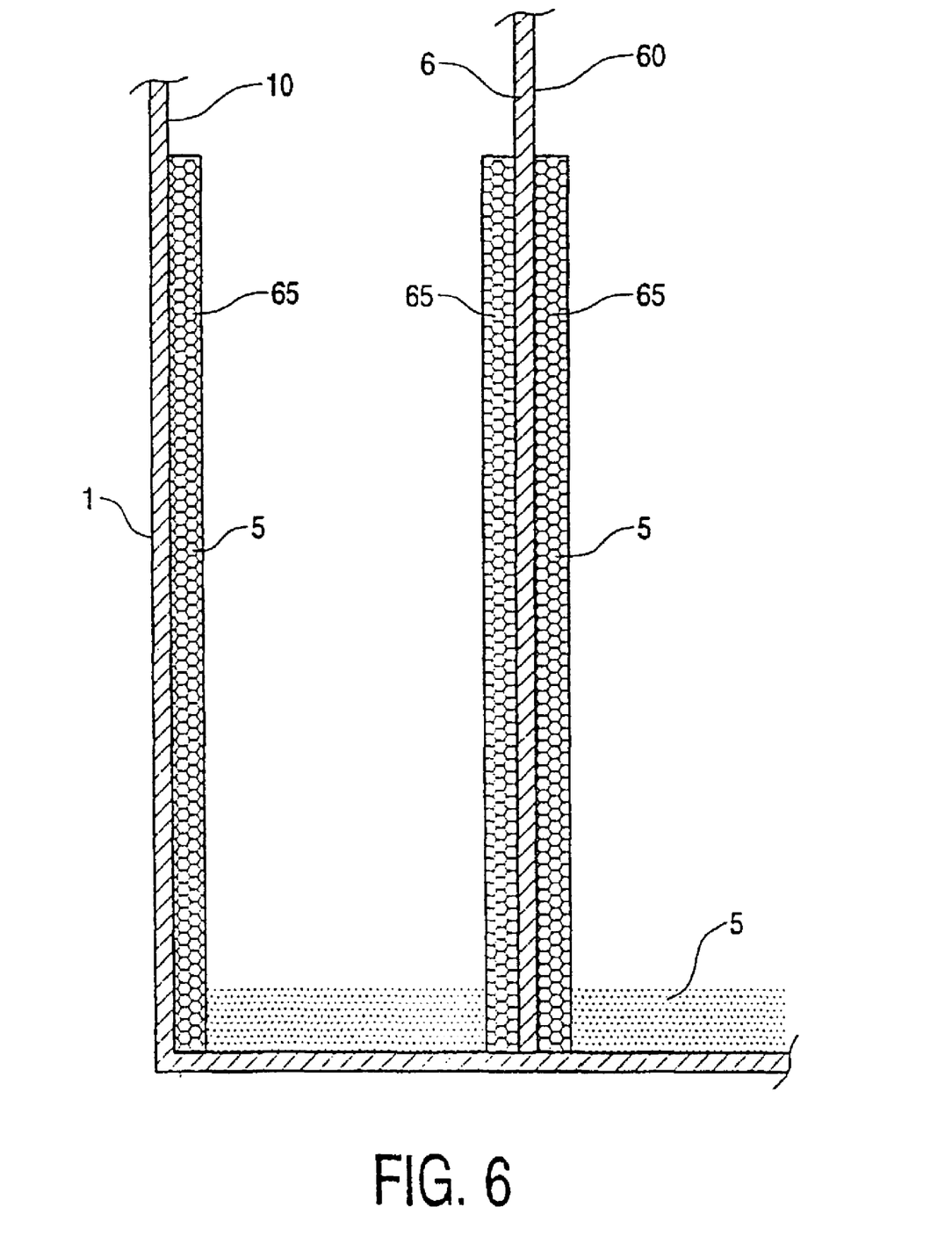
FIG. 6 is a cross-section of a part of a preferred embodiment of a filter unit according to the invention.

Filter unit 1and the neutralizing unit are preferably each provided with internal parts as shown schematically in FIG. 6. These internal parts comprise a porous layer 65 with which the vertical inner walls 10, 60 of the relevant unit are covered. In this case these are the whole of the inner wall 10 of housing 1 and the total area 60 of baffles 6. The nature and composition of this layer is itself less relevant, as long as the layer provides a capillary action whereby liquid is drawn out of the liquid bath. An active liquid surface is thus created above the level of the liquid in the bath, which significantly enlarges the total area over which the liquid can make contact with the waste gases, and therewith the effectiveness and performance of the device. Used for the internal parts in this embodiment is polystyrene foam which is largely inert and durable, although other optionally foam plastics and optionally mineral fibre materials can for instance also be used instead.

Figure 7:
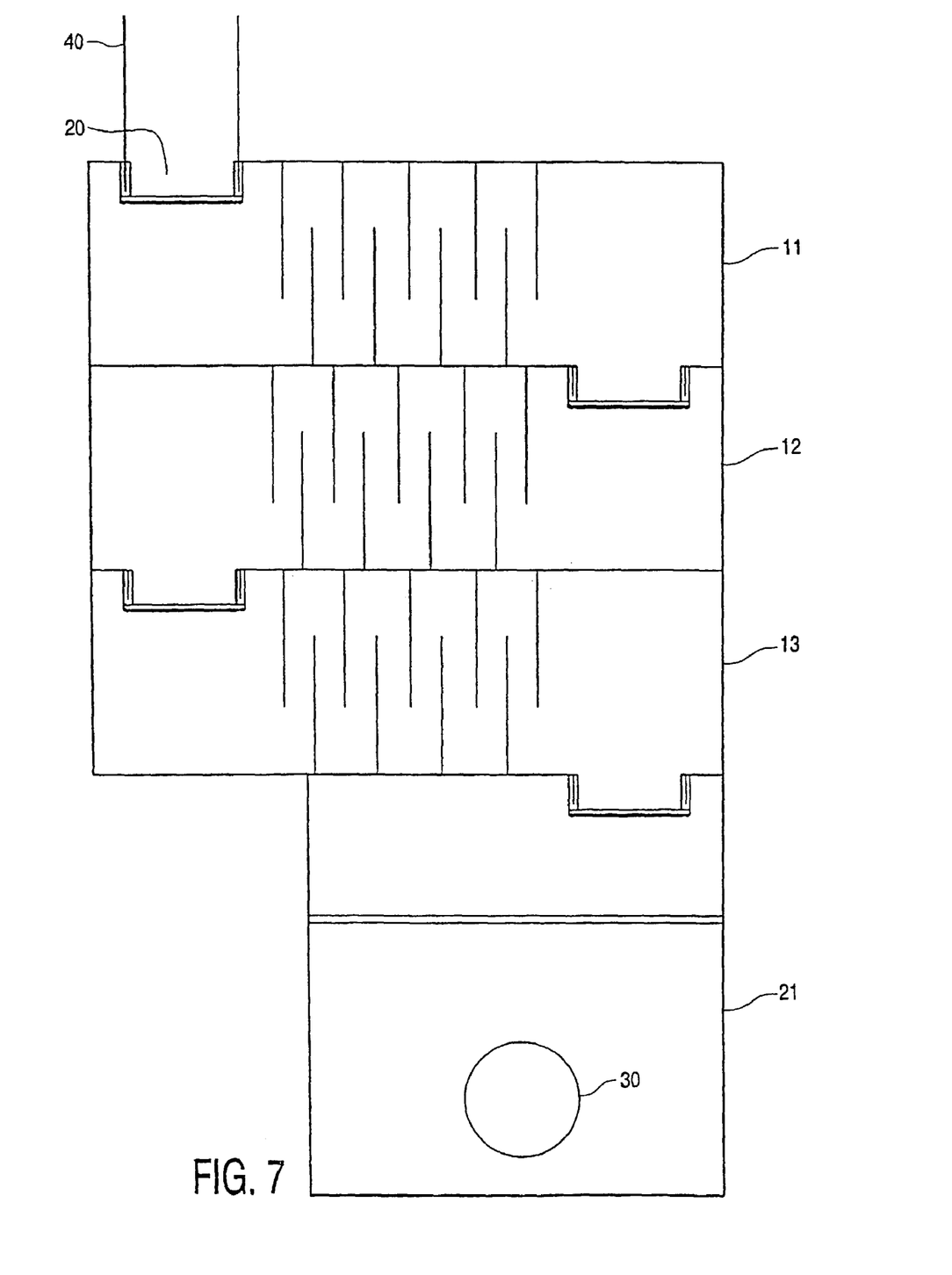
FIG. 7 is a longitudinal section of an embodiment of a waste gases-neutralizing device according to the invention comprising a filter installation.

An embodiment of a waste gases-neutralizing device comprising a filter installation including neutralizing unit according to the invention is shown in FIG. 7 and comprises a succession of three filter units 11, 12, 13 of the above described type and, finally, the above described neutralizing unit 21. Because of the well thought-out dimensioning, embodiment and placing of the individual inlets and outlets, the filter units and the neutralizing unit can herein be readily inserted into one another like building blocks. The different filter units 11, 12, 13 herein each comprise a liquid bath of individual and differing composition, wherein each liquid bath accounts for the removal of a specific component or group of components in the waste gases. In this case the first filter unit comprises Spezialwirkstoff Poly for the removal of hydrocarbons, particularly such as ethyl acetate, from the waste gases, while respectively EQ-CW and GN-ISO in the following units 12, 13 account for the dilution and removal of cellulose and other polysaccharide compounds. If these three liquids are not sufficient, the installation can, as a result of the invention, be extended in simple manner by adding one or more filter units with different filtering liquids in similar manner in order to also eliminate the remaining components. Owing to the invention the installation is completely modular and can therefore be adapted optimally to any practical situation.

The inlet of the first filter unit herein forms the inlet 20 of the installation, while the outlet of the neutralizing unit forms an outlet 30 of the installation. Using inlet 20 and outlet 30 the whole installation can be received in an existing waste gas discharge 40. In accordance with the specific size of the installation, the filtering capacity can herein rise from about 1000-2000 $m^3$/hour to values exceeding 10,000 $m^3$/hour, while possible undesired components in the waste gases are effectively eliminated therefrom to (far) below permissible values.

Figure 8:
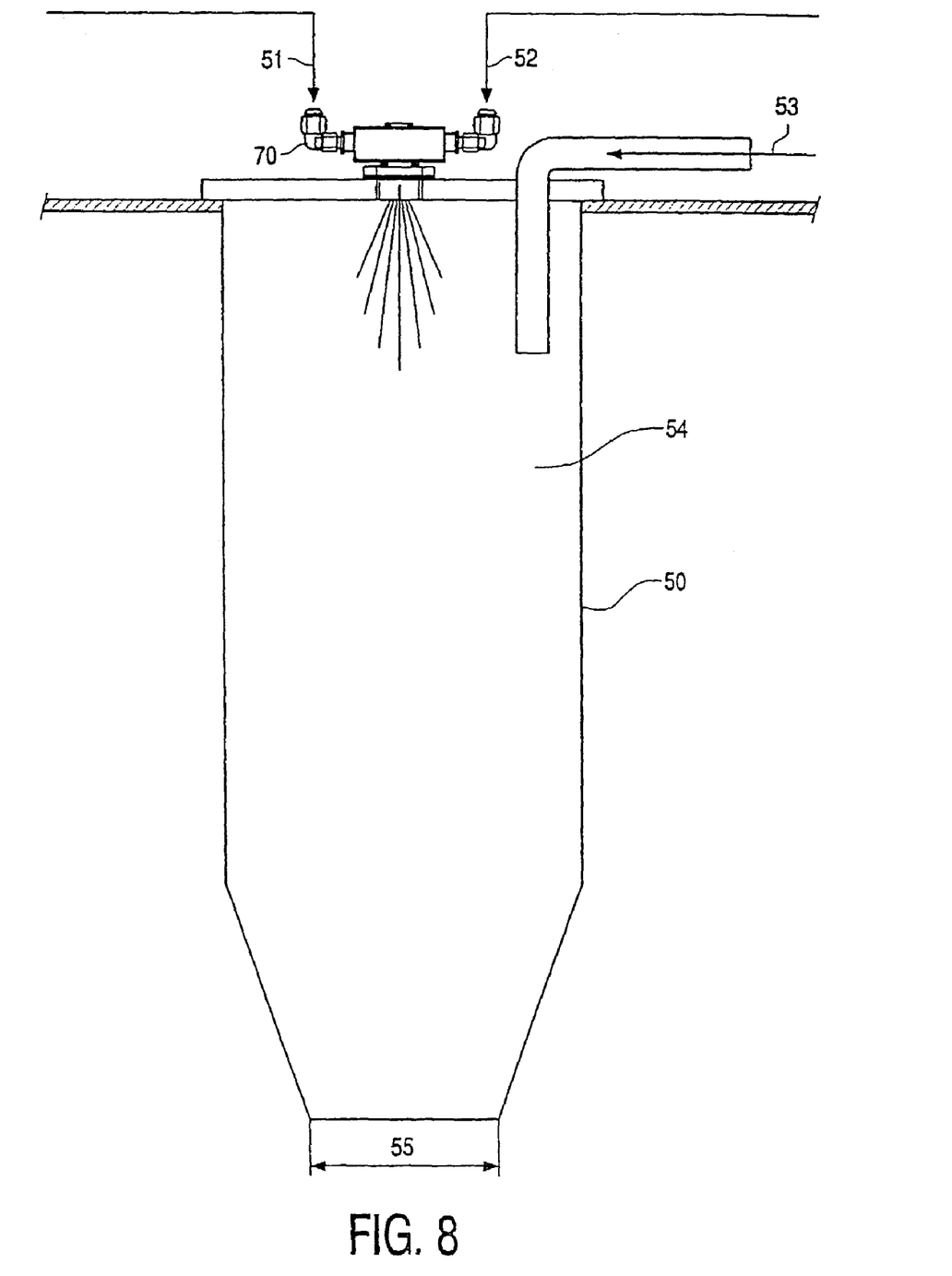
FIG. 8 is a cross-section of a reactor vessel according to the invention.
Figure 9:
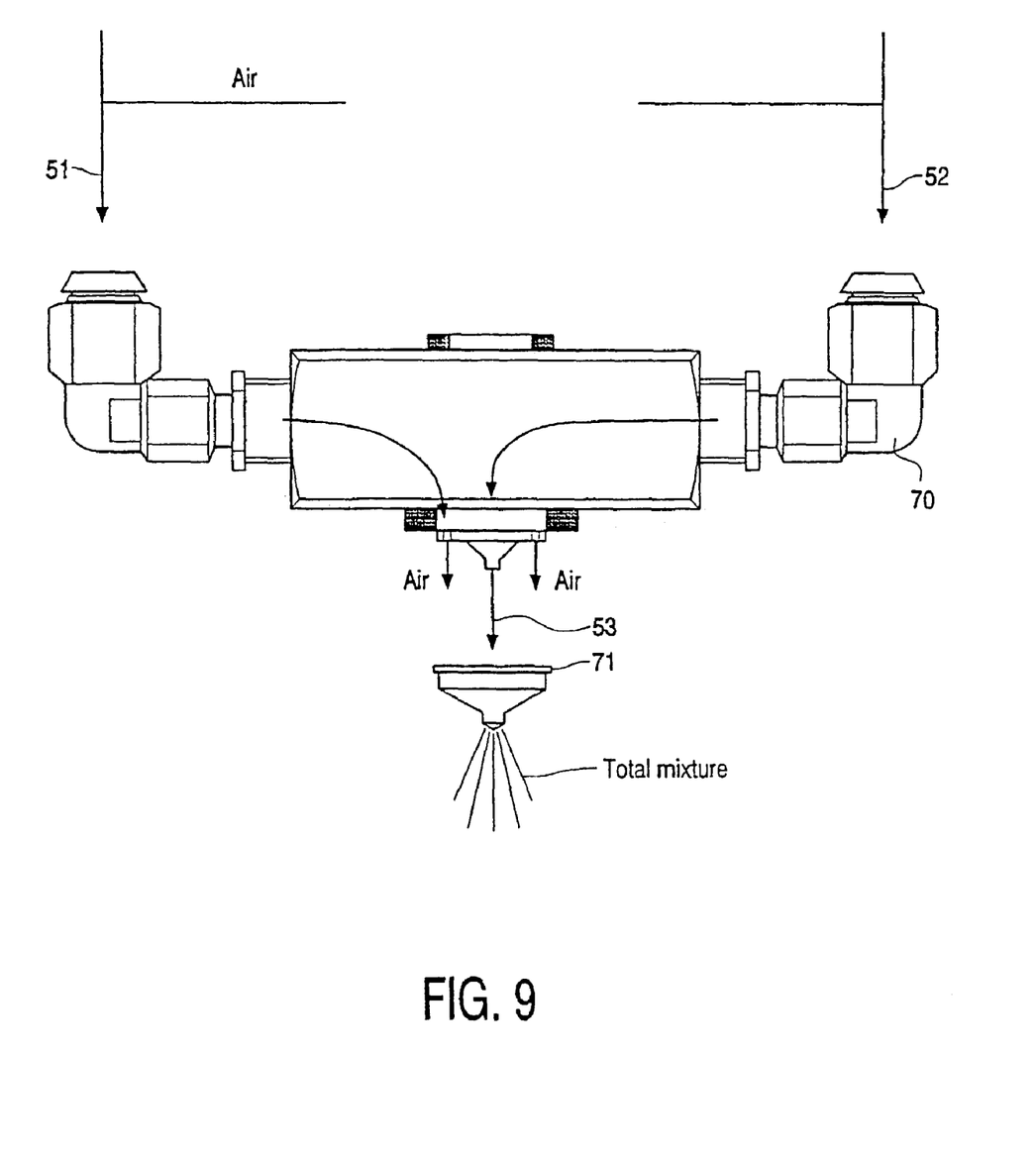
FIG. 9 shows a cross-section of a nozzle for use in the reactor vessel according to the invention.

FIG. 8 shows a second embodiment, viz. a waste gases-neutralizing device comprising a reactor vessel 50, wherein at one of the two infeeds 51 and 52 the waste gases-neutralizing compound and at the other infeed air or optionally oxygen is pressed into the nozzle 70, which nozzle is shown in detail in FIG. 9. The air and waste gases-neutralizing compound are mixed together under a pressure of 1-25 bar in a dish 71, whereafter the mixture and the waste gases which are pressed into the vessel at 53 react with each other in the reactor part 54 of the vessel at a temperature of 17° C.-28° C. and a pressure of 1-200 bar. At the comparatively small outlet 55, the dimension of which is variable, the compound resulting from the reaction of waste gases-neutralizing compound and oxygen leaves the vessel after intensive contact with the waste gases. The use of the nozzle in neutralizing waste gases as shown substantially schematically in FIG. 9 also forms an aspect of the invention.

Figure 10:
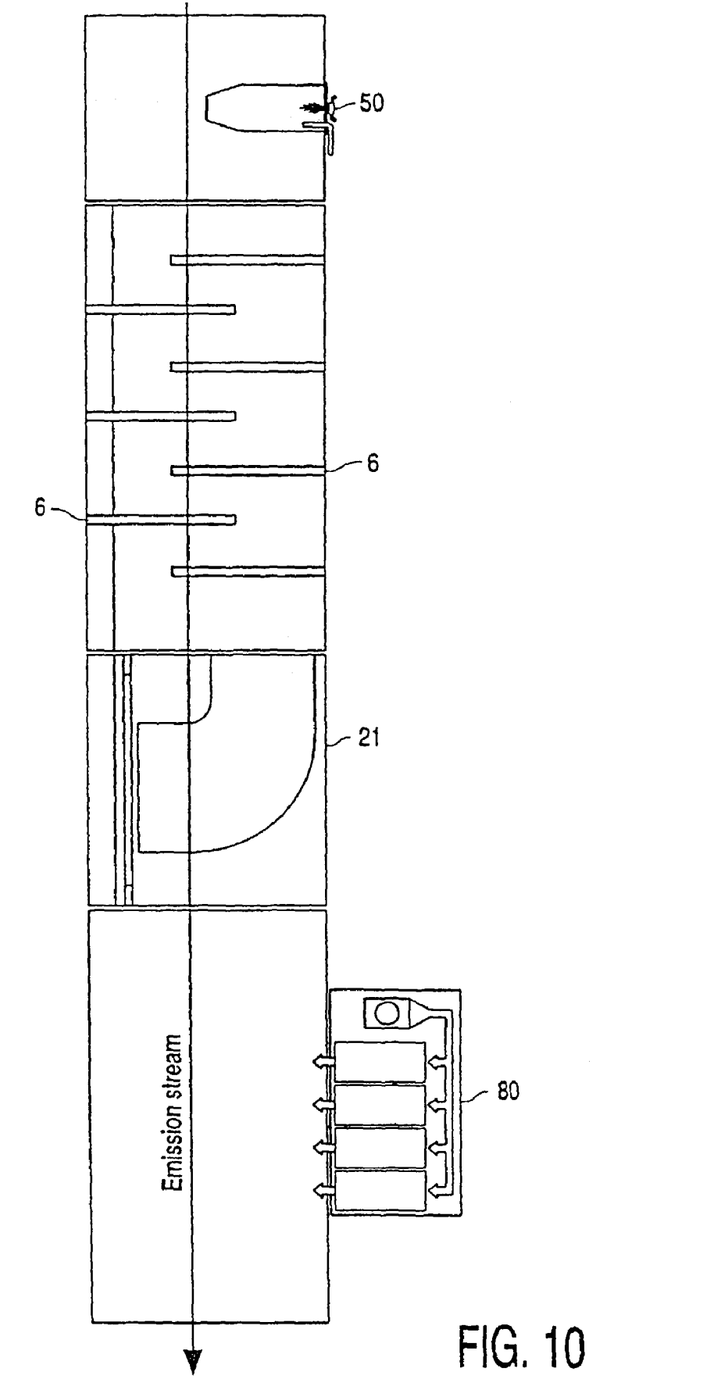
FIG. 10 shows a waste gases-neutralizing device comprising a reactor vessel, a modular filter unit, neutralizing unit and a UV generator.
Figure 11:
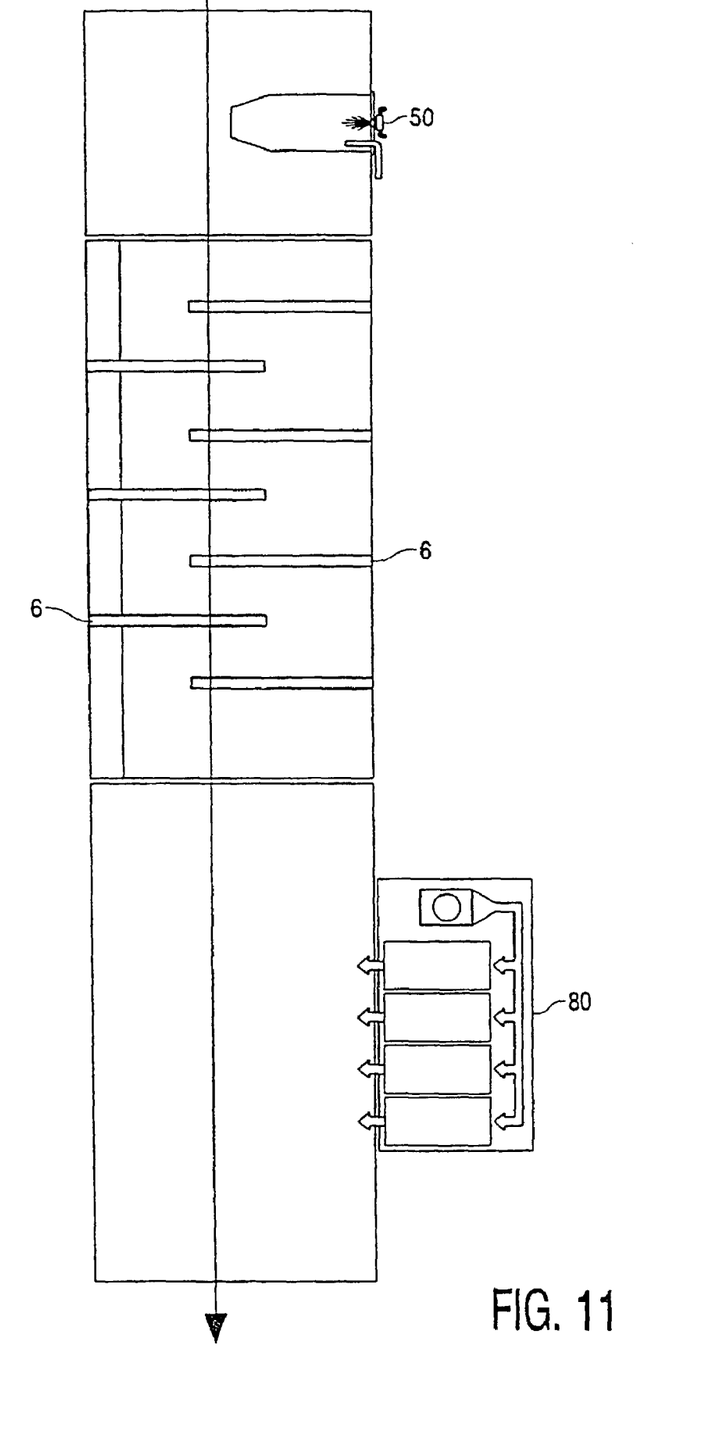
FIG. 11 shows a waste gases-neutralizing device comprising a reactor vessel, a modular filter unit and a UV generator.
Figure 12:
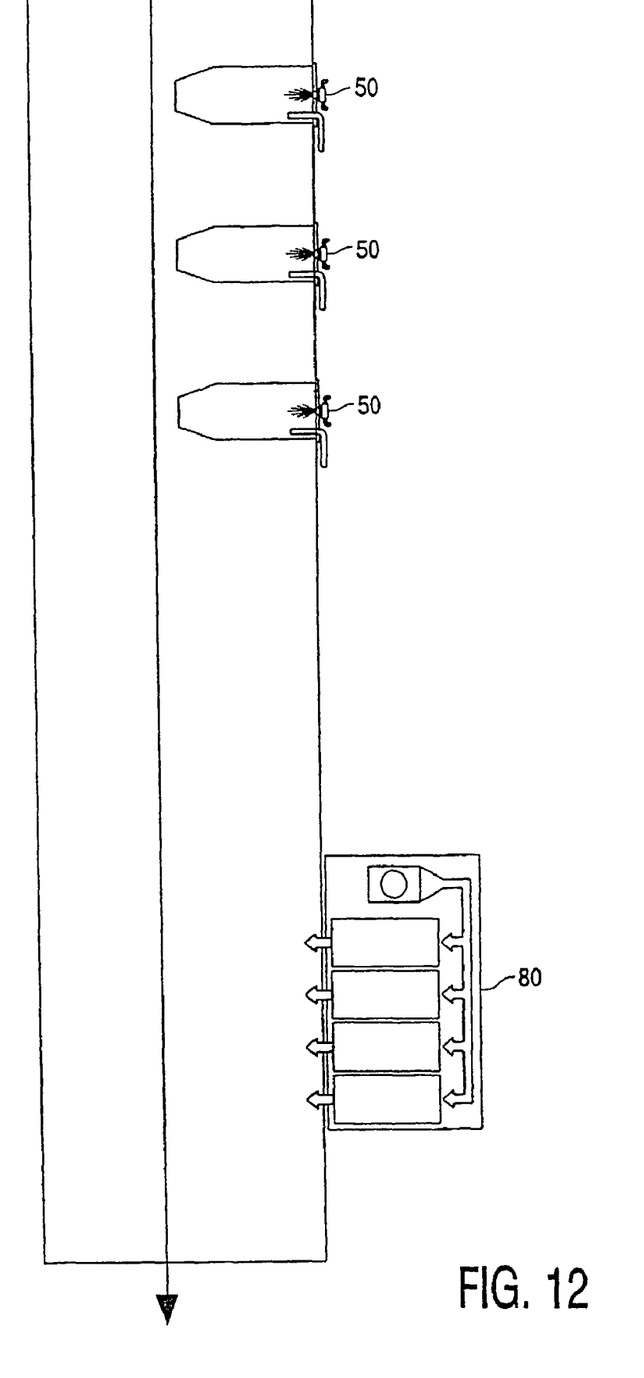
FIG. 12 shows a waste gases-neutralizing device comprising three reactor vessels and a UV generator.
Figure 13:
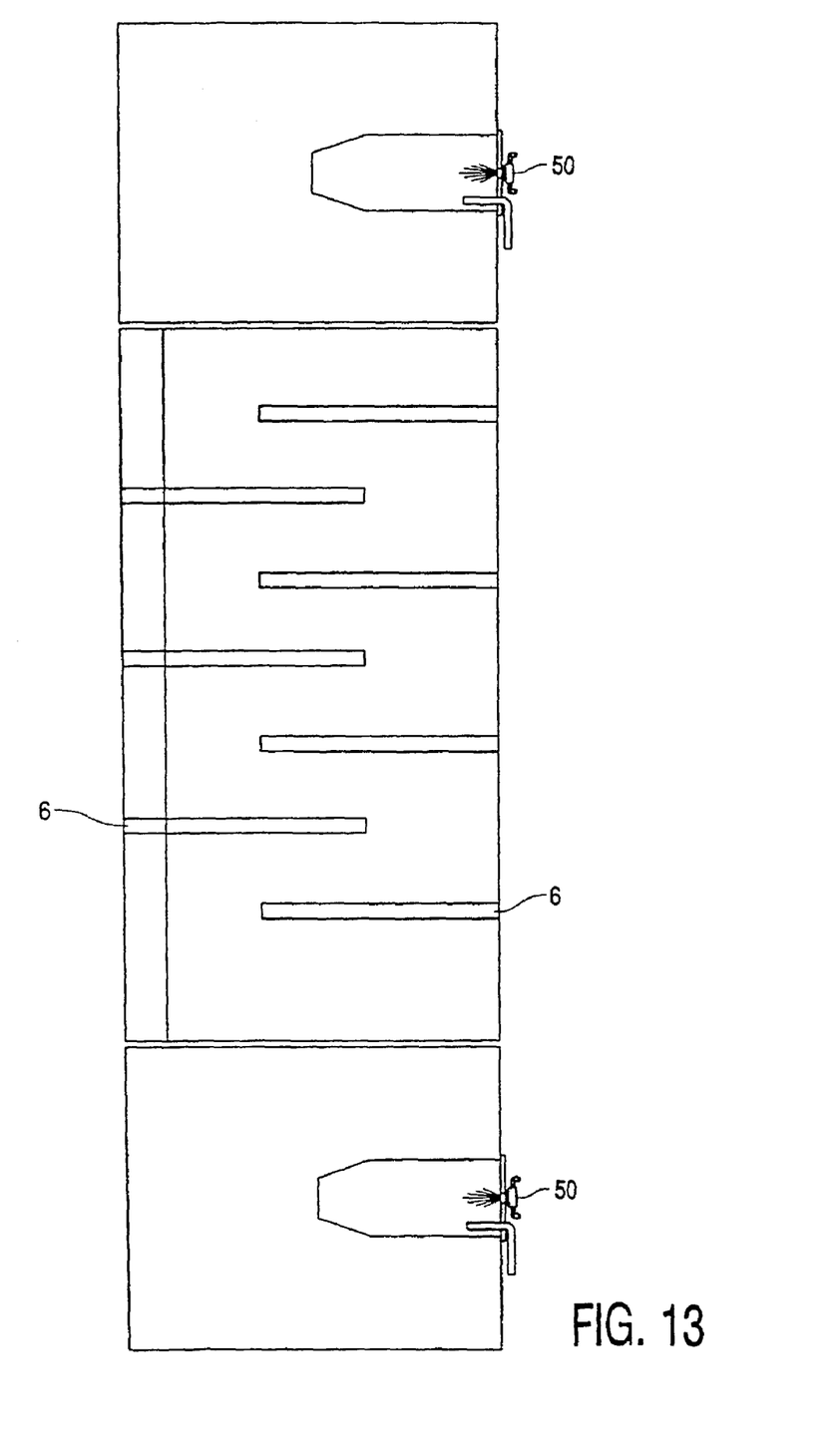
FIG. 13 shows a waste gases-neutralizing device comprising two reactor vessels and a modular filter unit.

A third embodiment of the invention is shown in FIG. 10, i.e. a reactor vessel 50, a filter installation with different filter units and a neutralizing unit 21, followed by UV generator 80. The emission flow follows the direction of the arrow. A fourth, fifth and sixth embodiment of the waste gases-neutralizing device as shown in FIGS. 11, 12 and 13 require no further explanation.

Figure 14:
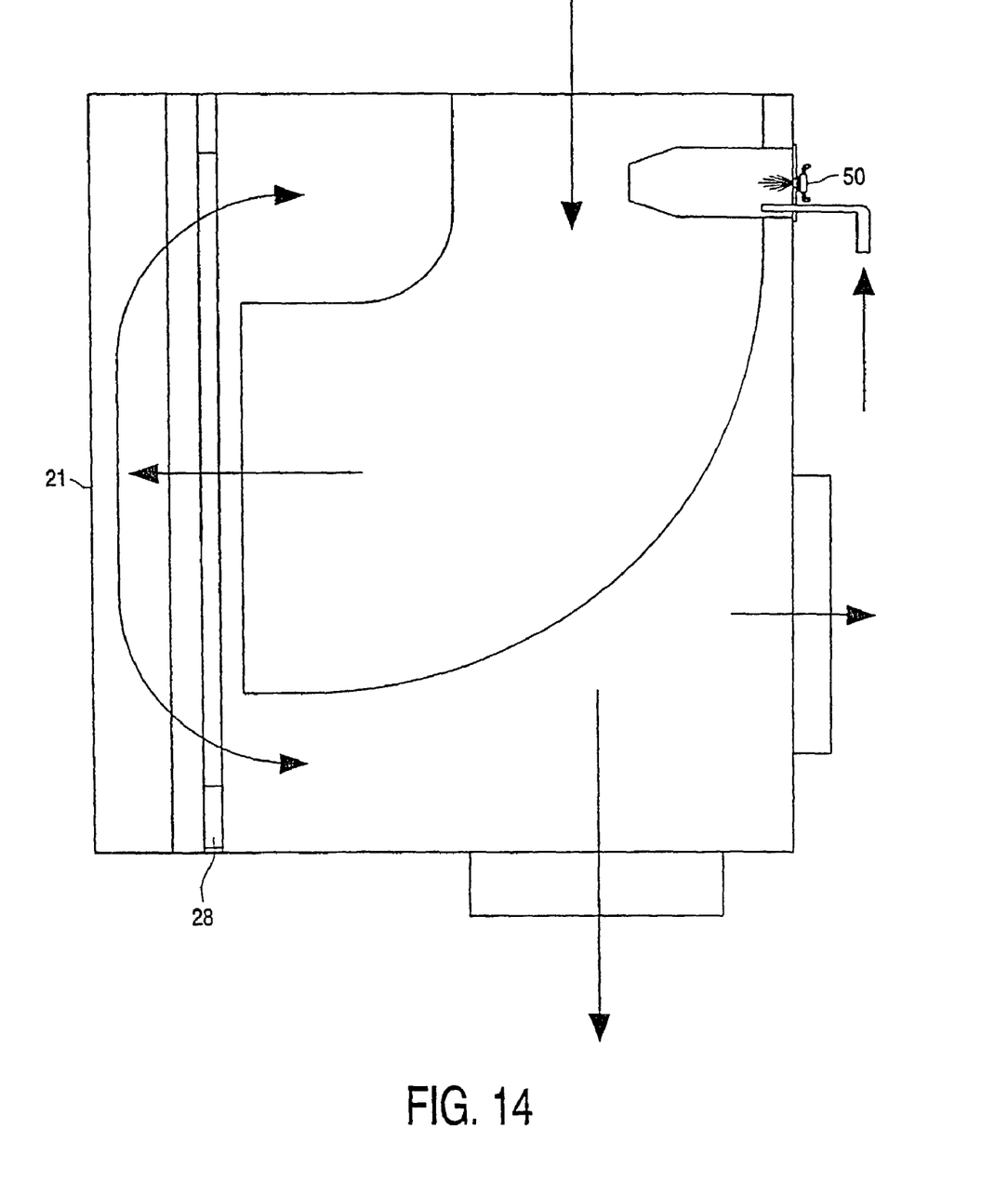
FIG. 14 shows a waste gases-neutralizing device comprising a reactor vessel and a neutralizing liquid bath.

FIG. 14 shows a seventh waste gases-neutralizing device comprising a reactor vessel 50 and a waste gases-neutralizing device 21. Two emission flows with waste gases enter both waste gases-neutralizing parts via the reactor vessel and the waste gases-neutralizing unit and react with the active compound formed in the reactor vessel and are guided over filter 28 of the neutralizing unit.

Although the invention has been further elucidated above with reference to several embodiments, it will be apparent that the invention is by no means limited to the given embodiments. On the contrary, many more variations and embodiments are possible for a person with ordinary skill in the art without departing from the scope of the invention.

The invention claimed is:

1. A waste gases-neutralizing device comprising:
    a filter installation with an inlet and an outlet between which a filter is received to remove undesired components from waste gases, said filter installation having a modular construction comprising a number of filter units placed in series in a flow path of the waste gases, wherein:
    each said filter unit is adapted to remove a specific undesired component or group of components from the waste gases, each said filter unit comprises a bath of a waste gas-neutralizing liquid that is adapted to interact with the waste gases and remove said undesired component or group of components,
    each said filter units comprises a system of mutually offset baffles extending traversely to said liquid bath to prolong the flow path of said waste gases along said liquid bath, said baffles are manually displaceable in an axial direction of said flow path,
    at least one upright inner wall of each said filter unit is covered with a porous layer extending from within said liquid bath, and
    a reactor vessel provided with a nozzle with a mixing chamber with which waste gases are at least partially removed with at least one neutralizing compound and oxygen.

2. The waste gases-neutralizing device according to claim 1, further comprising a UV generator.

3. A nozzle for application on a reactor vessel in the waste gases-neutralizing device as claimed in claim 1, comprising a mixing chamber where neutralizing material and air are brought together to form a mixture in a dish, from which the mixture is pressed into the reactor vessel.

4. A reactor vessel provided with the nozzle as defined in claim 3.

5. A waste gases-neutralizing device comprising:
    a filter installation with an inlet and an outlet between which a filter is received to remove undesired components from waste gases, said filter installation having a modular construction comprising a number of filter units placed in series in a flow path of the waste gases, wherein:
    each said filter unit is adapted to remove a specific undesired component or group of components from the waste gases, each said filter unit comprises a bath of a waste gas-neutralizing liquid that is adapted to interact with the waste gases and remove said undesired component or group of components,
    each said filter units comprises a system of mutually offset baffles extending traversely to said liquid bath to prolong the flow path of said waste gases along said liquid bath, said baffles are manually displaceable in an axial direction of said flow path, and
    at least one upright inner wall of each said filter unit is covered with a porous layer extending from within said liquid bath.

6. The waste gases-neutralizing device as claimed in claim 1, wherein in said reactor vessel said waste gases are at least partially removed with at least one neutralizing compound and oxygen, in air.

7. The waste gases-neutralizing device as claimed in claim 5, wherein said waste gas-neutralizing liquid is different for each said filter unit.

8. The waste gases-neutralizing device as claimed in claim 5, wherein, at the position of the liquid bath, each said filter unit comprises a system of a number of mutually offset baffles mounted for manual axial displacement in the flow path of the waste gases.

9. The waste gases-neutralizing device as claimed in claim 5, each said filter unit has an at least substantially rectangular cross-section, said inlet and outlet are placed diametrically opposite each other within each said filter unit, wherein the outlet within each said filter unit is arranged to form a gas-tight seal in the inlet of another said filter unit.

10. The waste gases-neutralizing device as claimed in claim 5, wherein after a final said filter unit there is placed a neutralizing unit with a neutralizing liquid bath or a fixed connection impregnated with a neutralizing liquid which contacts the waste gases and removes possible reaction products from the waste gases of each said filter unit.

* * * * *